(12) United States Patent
Enzmann et al.

(10) Patent No.: US 6,320,946 B1
(45) Date of Patent: Nov. 20, 2001

(54) INFORMATION PAYPHONE

(75) Inventors: Mark J. Enzmann, Roswell; Robert T. Moton, Jr., Alpharetta; Samuel N. Zellner, Dunwoody, all of GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/472,135

(22) Filed: Dec. 23, 1999

(51) Int. Cl.[7] .......................... H04M 11/00; H04M 17/00
(52) U.S. Cl. ................ 379/143; 379/93.22; 379/144.05; 379/144.07; 379/144.08; 379/155
(58) Field of Search .................... 379/143, 144, 379/146, 147, 148, 150, 151, 155, 93.05, 93.06, 93.18, 93.22, 93.23, 93.31

(56) References Cited

U.S. PATENT DOCUMENTS

| | | | |
|---|---|---|---|
| 4,720,849 | * | 1/1988 | Tayama .............................. 379/90.01 |
| 4,768,227 | | 8/1988 | Dively et al. ........................ 379/112 |
| 5,218,633 | * | 6/1993 | Clagett et al. ....................... 379/144 |
| 5,438,568 | | 8/1995 | Weisser, Jr. ............................ 370/60 |
| 5,483,582 | * | 1/1996 | Pugh et al. ............................. 379/144 |

* cited by examiner

Primary Examiner—Binh Tieu
(74) Attorney, Agent, or Firm—Kirkpatrick & Lockhart LLP

(57) ABSTRACT

A payphone or coin-operated telephone that functions as an information transmittal device that dispenses user-selected information audibly to the user via the speaker in the payphone handset. A variety of information is stored in an information storage unit provided within the payphone unit. The information includes frequently-requested information on topics such as, for example, news, weather, sports, financial market reports, local travel information, local telephone yellow pages, etc. The user of the payphone may incur a nominal charge to retrieve the information from the payphone. A processing unit within the payphone or the information storage unit may update the content of the information with the help of an external information server or the Internet. The information server may be located within a telephone company central office and the central office switch may connect the information server to the processing unit in the payphone for desired data transfer. The information is thus directly available from the payphone itself. This allows payphone user to obtain a wide range of information from the payphone without resorting to phone calls to multiple sources of information and without incurring substantial, unnecessary expenses related to such phone calls.

13 Claims, 5 Drawing Sheets

INFORMATION PAYPHONE

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Field of the Invention

The present invention broadly relates to telecommunication devices, and more particularly, to a payphone that stores different categories of information and audibly plays back one or more categories of information to a user of the payphone.

2. Description of the Related Art

Telephone communication has seen a phenomenal growth since its inception because of its extreme usefulness in today's world. It is hard, and almost impossible, to conceive of a world without telephones. Telephones have almost become an integral part of a civilized society. One major source of revenue for a telephone service provider is derived from supplying telephone services to residential and business customers. However, payphones owned and operated by the service provider may also generate substantial revenues for the service provider because of the call-making flexibility afforded by a payphone.

Payphones or coin-operated phones are, as the names suggest, regular telephones that are operative when a requisite amount of money is deposited into the phone units. When a user wishes to use a payphone, the user deposits a minimum amount (e.g., 35 cents), dials the telephone number of the called party, and a central office enables completion of the call once the minimum cost of the call has been satisfied. The central office also determines how much the call will cost beyond the minimum amount already deposited and advises the caller of any added cost to allow continuation of the call. When the called party answers, the user can immediately speak with the called party. However, if the called party does not answer or if the called telephone is busy, the deposited coins are returned to the user.

Signals from a central office which enable collection or return of deposited coins may not be provided on all telephone lines emanating from the central office, but may be provided to only those telephone lines running from the central office to central office-owned (i.e., telephone service provider-owned) payphones. Alternatively, privately-owned payphones may be available with requisite signal generation and control circuitry physically built into the payphones. In that event, the person owning the payphone may provide coin-operated telephone services to users by installing the payphone at the person's place of business, e.g., a restaurant, and connect the payphone to a conventional telephone line running into such place of business. Such purchased payphones have self-contained control and operation circuitry, internal to the payphone unit, to compute required coin deposits and to control whether deposited coins should be collected or returned. In one version of a privately-owned payphone, the payphone is initially coupled to the central office when the user removes a handset from the switchhook so that a dial tone may be supplied from the central office to prompt the user to enter the telephone number of the called party. In another version, a privately-owned payphone may include a local dial tone generator to supply the dial tone from the payphone itself without obtaining the dial tone from the central office. The payphone may receive the digits dialed by the user and may then transmit them to the central office for further call processing.

Further improvements in payphones have resulted in payphones with display terminals and/or with facilities to swipe a calling card prior to placing a phone call. A display screen provided as part of the payphone may allow a user to monitor the cost of the phone call, the time spent on the call, the number dialed to reach the called party, the calling card number entered (if applicable), etc. The display screen may also show marketing messages the service provider wants the user to read. A calling card swiping facility relieves the user from entering a calling card number, thereby preventing mistakes that may be made while entering a long account number.

It is noted, however, that a technologically-advanced payphone still fails to provide solutions to a number of problems routinely encountered by payphone users. For example, a car owner whose car needs to be towed may not be aware of which towing companies are present in the neighboring area. In that case, the car owner may have to place one or more directory-assistance calls using the payphone, thereby incurring call charges. In another example, a tourist at a payphone may desire to get up-to-date weather information for the local area. Without knowing who to call, the tourist may have to rely on the information supplied by people nearby or may incur call expenses to obtain the desired information. Also, a person at a highway payphone booth may wish to receive the latest information about the person's choice of sports events. Such information may not be easily available unless that person has access to the Internet or the person calls somebody (thus incurring call expenses, which may be long-distance call expenses in certain cases) who can then supply the desired information.

The foregoing examples illustrate how inconvenient and frustrating it is to obtain certain information during routinely occurring real-life situations. It is therefore desirable to have a mechanism whereby a user can obtain the desired information directly from the payphone without resorting to phone calls and their concomitant call expenses. In other words, it is desirable to enhance the functionality of a payphone so that the payphone audibly dispenses the requisite information (i.e., functions as an information transmittal device).

SUMMARY OF THE INVENTION

A payphone or coin-operated telephone according to the present invention includes a speaker, and an off-hook sensor configured to generate an off-hook signal upon detecting an off-hook condition, a housing, an information storage unit in the housing and capable of storing audio information therein, wherein the information storage unit is configured to send one or more parts of the audio information to the speaker when connected thereto, and a processing unit in the housing and coupled to the information storage unit and the off-hook sensor, wherein the processing unit is configured to receive the off-hook signal from the off-hook sensor and thereafter connect the information storage unit to the speaker upon occurrence of a predetermined event.

The information stored in the information storage unit may include frequently-requested information on topics such as, for example, news, weather, sports, financial market reports, local travel information, local telephone yellow pages, etc. The user of the payphone may incur a nominal charge to retrieve the information from the payphone. In other words, the payphone may function as an information transmittal device that dispenses user-selected information audibly to the user via the speaker in the payphone, e.g., the speaker in a payphone handset.

In one embodiment, the user may be prompted by the processing unit to enter specific digits and/or symbols from the keypad on the front panel of the payphone to initiate information retrieval from the payphone. In another embodiment, the user may select the desired information by speaking the user's choice into the microphone of the payphone handset. The payphone front panel may also include a display screen allowing the user to view the selection made, and also allowing the user to view certain information on the display screen.

The payphone is typically connected to a telephone company central office or to a private branch exchange via a telephone line. The information stored in the information storage unit may be downloaded automatically from an information server (external to the payphone) or the Internet or may be manually updated with information stored on a magnetic storage medium, e.g., audio tapes. The processing unit may be configured to access the information server through the Internet for requisite information to be transferred to the information storage unit. In one embodiment, the information storage unit is located within a telephone company central office and is connected to a central office switch. The switch in the central office may be configured to connect the information server to the processing unit requesting the information. In an alternative embodiment, the information server is part of a service node in an AIN (Advanced Intelligent Network) telephone network and the central office switch is an SSP (Service Switching Point) switch.

The information storage unit may also be configured to initiate access to the information server or the Internet. The information storage unit may search for the desired information with the help of a web browser forming part of the information storage unit. The information received from the information server or the Internet may be in the form of digital text files, which may be converted into digital data in an audio format with the help of a text-to-speech converter provided in the information storage unit. An audio logic unit inside the payphone may convert digital audio files into synthesized voice when the information is sent to the user via the speaker in the payphone handset.

The localized storage of relevant information in the payphone thus facilitates quick retrieval of the information when requested by the user. The information is thus directly available from the payphone itself. This allows a payphone user to obtain a wide range of information from the payphone without resorting to phone calls to multiple sources of information and without incurring substantial, unnecessary expenses related to such phone calls.

BRIEF DESCRIPTION OF THE DRAWINGS

Further advantages of the present invention may be better understood by referring to the following description taken in conjunction with the accompanying drawings, in which.

DETAILED DESCRIPTION OF PREFERRED EMBODIMENTS

Figure 1:
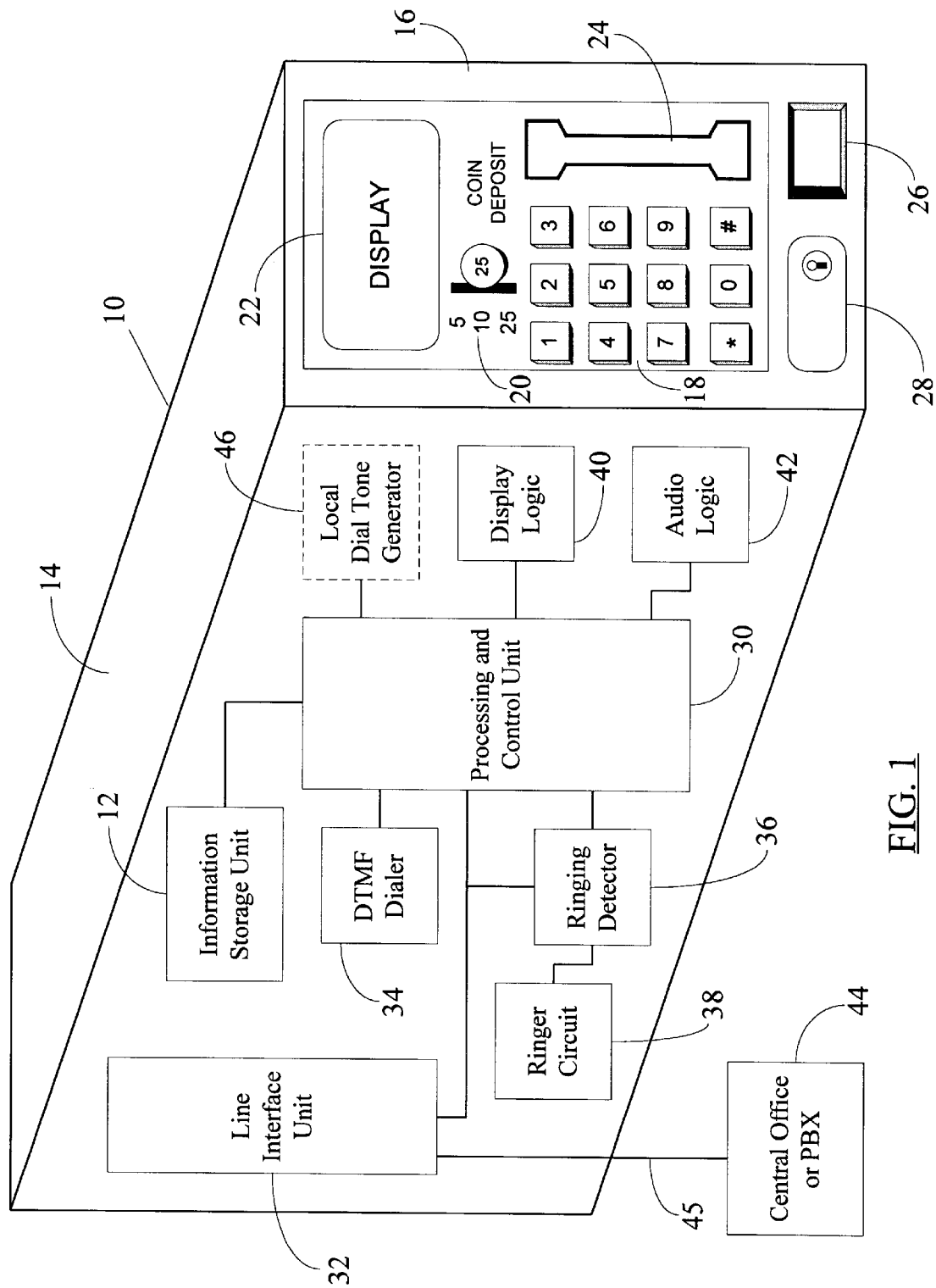
FIG. 1 shows an exemplary perspective diagram of a payphone or a coin-operated telephone showing an information storage unit as part thereof.

Referring now to FIG. 1, an exemplary perspective diagram of a payphone or a coin-operated telephone 10 showing an information storage unit (ISU) 12 as part thereof is shown. As described in more detail hereinbelow, the information storage unit 12 audibly supplies user-selected information to a user of the payphone 10. Broadly speaking, the term "information" may include various sub-categories, e.g., news, sports, weather, financial market conditions, local yellow page directory, local places to visit, etc. The selection of information may depend, among other factors, on the location of the payphone, on the storage capacity of the ISU 12 and on the limit placed by the payphone owner as to the scope of information coverage.

The payphone 10 is contained in a housing 14 and includes a front panel 16 for user interaction. The housing 14 is typically made of metal or rigid plastic so that the payphone 10 can be securely mounted, for example, on a wall or on any other flat surface. The front panel 16 is securely attached, e.g., via hinges (not shown), to the housing 14 and is also typically made of the same material as that used to manufacture the housing 14. In one embodiment, the front panel 16 is a part of the housing 14, i.e., the front panel 16 may be mechanically inseparable from the housing 14.

The front panel 16 may include, among other facilities, a keypad 18 with which a user may enter a telephone number or a calling card number, a slot to deposit coins/money 20, a display screen (or, simply, a display) 22 to view the user's selection or the user's entry of keypad digits, a handset 24 for conversation with the called party, an opening 26 for the user to receive coins that are returned by the payphone 10, and a coin collection panel 28 that an authorized service person may open to collect coins deposited in the payphone 10. The display 22 may additionally display short messages to which the owner of the payphone 10 may desire to draw the user's attention. The handset 24 includes a speaker (not visible) and a microphone (not visible) to carry out phone conversations.

The handset 24 may rest on a hookswitch or on a handset cradle (not visible in FIG. 1) that senses when the handset 24 is taken "off-hook" by a user desiring to initiate a phone conversation. Instead of a mechanical hookswitch or cradle, a sensor (not shown) may be provided on the back side of the front panel 16 (i.e., on the side that is not visible to the user). The sensor may detect when the handset 24 is placed on the front panel (i.e., "on-hook") and when the handset 24 is removed from the front panel (i.e., "off-hook") based on, for example, detection of changes in weight or magnetic inductance resulting from removal of the handset 24 from the front panel. Additional utilities of various elements comprising the front panel 16 are described hereinbelow.

FIG. 1 further shows internal circuit elements of the payphone 10 in a simplified block diagram. The electronic circuitry operating the payphone 10 is disposed within the housing 14 as illustrated in FIG. 1. Besides the information storage unit 12, other circuit elements include a processing and control unit (PCU) 30, a line interface unit (LIU) 32, a DTMF (dual tone multi-frequency) dialer 34, a ringing signal detector 36, a ringer circuit 38, a display logic unit 40 and an audio logic unit 42. The processing and control unit 30 includes a computer that manages all aspects of call processing (including verification of deposited money, processing of various messages for visual display, audio transmission, dial-tone supply, etc.) as well as connecting the ISU 12 to the speaker in the handset 24 (as described hereinbelow).

The line interface unit 32 is shown connected to a telephone company (telco) central office (CO) or a PBX (private branch exchange) 44 via a telephone line 45. It is noted that all the electronic circuit elements housed within the payphone housing 14 may get electrical power supply from the central office (or PBX) 44 via the telephone line 45. If the power from the CO 44 is not sufficient, then an additional power source (not shown) such as a battery placed within the housing 14 or a power cord extending from the housing 14 and configured to be connected to a local power source (e.g., a 120 volt A.C. power outlet) may be provided. Further, the term "telephone line" is used to include more than one telephone line that may be present in a given implementation of the configuration shown in FIG. 1. In that case, all of such lines may be collectively referred to by the numeral "45".

When a user lifts the handset 24 from its cradle, i.e., when the handset 24 is placed in an off-hook condition, the hookswitch or the handset cradle may detect that condition and transmit an indication (or, an "off-hook signal") of the handset's 24 off-hook status to the PCU 30. The PCU 30, in turn, may instruct the LIU 32 to transfer the dial tone received from the CO or PBX 44 to the PCU 30, which, in turn, sends the dial tone signal to the audio logic unit 42. The audio logic unit 42 transmits the dial tone to the speaker in the handset 24, thereby establishing the dial tone to prompt the payphone user to enter the user's selection (e.g., a called party's telephone number) via the keypad 18.

In an alternative embodiment, the payphone 10 may also include an optional, built-in dial tone generator 46 as illustrated by the dotted block in FIG. 1. Here, upon receiving the indication that the handset 24 is off-hook, the PCU 30 immediately connects the local dial tone generator 46 to the audio logic unit 42, instead of obtaining the dial tone from the central office 44. The dial tone generated by the generator 46 is thus supplied to the handset speaker. The telephone number keyed-in by the user (after the dial tone is established) is then sent to the central office or PBX 44 as usual so that the CO or PBX 44 may process the desired call connection.

The payphone 10 may also receive phone calls originated from other phones. In such a case, the CO or PBX 44 may send a ringing signal to the LIU 32. The LIU 32 then forwards the ringing signal to the PCU 30, which, in turn, sends the signal to the ringing signal detector 36. Upon detecting the ringing signal, the ringing signal detector 36 activates a ringer generation circuit 38 to audibly generate ringing sound alerting the user of the payphone to pick-up the handset 24 and receive the call. When the central office or the PBX 44 supports DTMF dialing, the keypad entries received by the PCU 30 are communicated to the DTMF dialer 34, which, in turn, generates corresponding DTMF signals to be sent to the CO or PBX 44 via the PCU 30 and the LIU 32.

It is noted that all of the foregoing functions, and other additional information as discussed later hereinbelow, may be displayed on the display screen 22 as and when the appropriate action is taking place. Thus, the PCU 30 may generate proper commands and signals for the display logic unit 40, which, in turn, may control the display of visual information on the display screen 22. For example, the ringing detector 36 may inform the PCU 30 of the detection of the received ringing signal. The PCU 30 may then send an appropriate message to the display logic 40 to display 'RINGING' on the screen 22. In another example, when the user-dialed digits are collected by the PCU 30 and once the DTMF dialer 34 starts dialing the entered digits via the LIU 32, the PCU 30 may instruct the display logic unit 40 to display the phrase 'DIALING IN PROGRESS' on the visual display screen 22. Other messages may also be conveniently displayed on the screen 22. For example, as soon as the user presses a key on the keypad 18, the corresponding digit may be displayed on the display screen 22 by the display logic 40. In short, the display logic 40 monitors and manages display functionality for the payphone 10.

The information storage unit 12 stores a wide range of information that may be frequently requested by users of the payphone 10. The content of information may vary from one geographic location to another depending on user preferences. Once the PCU 30 connects the ISU 12 to the audio logic unit 42, the ISU 12 starts sending audio signals to the audio logic unit 42, which transmits the audio signals to the speaker in the handset 24 for audio reproduction. These audio signals contain user-selected information in audible form. The user-selected information is thus audibly played to the user. The PCU 30 may connect the ISU 12 to the audio logic unit 42 in two different ways: (1) Immediately upon the lifting of the handset 24 by the user and without any input from the user, i.e., as soon as the handset 24 is detected (by the PCU 30) in an off-hook condition; or (2) When the user enters a pre-selected number or symbol indicating his/her desire to obtain information from the payphone 10. This user action may occur some time after the user places the handset off-hook.

In the first option mentioned in the preceding paragraph, the PCU 30 connects the ISU 12 to the audio logic unit 42 upon receiving an indication (from the hookswitch) that the handset 24 is off-hook. In that embodiment, the PCU 30 does not instruct the LIU 32 (or the local dial tone generator 46, if present) to establish the dial tone. Thus, the user starts receiving messages stored in the ISU 12 as soon as the user lifts the handset 24. This kind of free supply of information may not be desirable if the payphone owner incurs expenses for information storage and dissemination. However, the payphone owner may recoup the investment through advertising revenue. Further, the information delivered through this option may not be user-specific because of the general nature of the delivery. Also, the PCU 30 may be programmed to discontinue information transmission after a predetermined time (e.g., 20 or 30 seconds) and establish the dial-tone thereafter (in a manner described hereinbefore).

Whereas in the second option mentioned hereinabove, the PCU 30 first establishes the dial tone to the handset 24 (as discussed hereinbefore) as soon as the handset 24 goes off-hook. Thereafter, the user of the payphone 10 may receive audible or visible instruction/choice informing the user to press one or more digits ("0" through "9") or symbols ("*" and "#") on the keypad 18 if the user wishes to receive audio information from the payphone 10 (i.e., from the ISU 12). The user prompting may be done through a software executed by the PCU 30 or with additional hardware. For example, once a predetermined time has elapsed after establishing the dial tone and if no further activity from the user is detected (e.g., dialing of a telephone number) by the PCU 30, then the PCU 30 may generate an audible message (e.g., "Please enter *11 for information menu choices") or a similar visible message (on the display screen 22) with the help of audio logic unit 42 and the display logic unit 40 respectively. The predetermined time may be programmed in the operating software within the PCU 30 or may be computed with a hardware counter mechanism as is known in the art.

As mentioned hereinbefore, the payphone owner may either provide information free of charge for a fixed duration or, alternatively, the PCU 30 may be configured to generate a visible or audible message that first informs the user to deposit a nominal amount, e.g., 35 cents, prior to entering information retrieval code, e.g., *11. In one embodiment, once the user lifts the handset 24 off-hook, the user hears the dial-tone as well as receives a message on the display screen 22 informing the user to deposit the requisite money if the user wishes to receive desired information. Once the user deposits the required money and enters the information retrieval code, the dial-tone is cut-off and the user receives a menu on the screen 22 to select the information user wishes to receive. In another embodiment, the user may be allowed to enter the information retrieval code first (while the dial-tone is still present) and thereafter the dial tone may be muted while a message (e.g., "Please deposit 25 cents to receive information selection menu.") is being displayed on the screen 22. If the user deposits the correct amount, the user may receive the information selection menu on the display screen 22. However, if the user fails to respond within a pre-set time period, the screen may revert to the original display (or go blank) as if no information retrieval code had been entered; and the dial-tone may also be re-established. Other combinations of audible and/or video alert mechanisms may be similarly conceived. The nominal charge may offset the payphone owner's cost to retrieve, store and disburse the information as well as to prevent potential misuse of the service facility by unscrupulous users.

Once the user deposits the requisite amount of money and enters the appropriate information selection code, the display screen 22 may display a menu of information selection choices. The menu of options may be generated by the PCU 30 or by the ISU 12 (if PCU 30 is configured to connect the ISU 12 to the display logic unit 40 at this juncture). An exemplary display of menu options may include the following:

Press "1" for local news.
Press "2" for national news.
Press "3" for local weather.
Press "4" for sports update.
Press "5" to access local yellow pages.
Press "6" for Internet access.

Different or additional options may be provided as desired by the payphone owner. Further, sub-options within a general option may also be provided. For example, if the user presses "5" on the keypad, then the screen may display the following information and sub-options.

You have entered "5" to access local yellow pages.
Please choose one of the following selections.
Press "1" for automobile-related information.
Press "2" for health-related information.
Press "3" for travel-related information.
Press "4" for shopping-related information.
Press "5" to go back to the previous menu.

Additional or alternative sub-categories may also be maintained in the ISU 12. For example, the automobile-related information sub-category may include towing service information, automobile rental information, information about automobile repair shops in the local area, etc. Upon selection by the user of appropriate category/sub-category, the PCU 30 may connect the ISU 12 (if it has not already done so) to the display logic unit 40 to relay the user-selected information thereto for display on the screen 22. In one embodiment, the display screen 22 is touch-sensitive. The user may simply touch the appropriate choice displayed on the screen 22. The screen 22 may then transmit the user selection to the PCU 30 which, in turn, will connect the ISU 12 to the display logic unit 40 for display of requested information.

In one embodiment, the display screen 22 may not be present on the front panel 16, or the payphone owner may select only audible delivery of all menu selection choices as well as information messages. In that case, instead of visual display of user-selected information or visual display of menu choices, the payphone 10 may provide appropriate audio messages to the user. The PCU 30 may connect the ISU 12 to the audio logic unit 42 for delivery of user-selected information and the menu options in an audible form to the speaker in the handset 24. For example, the menu choice options mentioned hereinbefore for visual display may instead be audibly played by the ISU 12 to the user. The user may then press appropriate keys on the keypad 18 to retrieve the desired information. Alternatively, the PCU 30 (or, the audio logic unit 42) may include speech recognition module (not shown) to allow the user to indicate the selected numerical choice by speaking the choice into the microphone (not shown) of the handset 24 instead of keying-in the choice through the keypad 18. The menu options may be stored as digital text messages within the ISU 12, and the ISU 12 may generate synthesized speech from the corresponding text when prompted by the PCU 30. The storage and upgrade of information as well as the generation of audible information messages by the ISU 12 is described hereinbelow with reference to the embodiments depicted in FIGS. 2–6.

It was noted hereinbefore that the user-selected information may be audibly played back via the speaker in the handset 24. In one embodiment, the relevant information (e.g., weather, news, sports or travel information) is stored as an audio recording in the ISU 12. The ISU 12 may then be an audio playback device, e.g., an audio cassette tape player or a DAT (Digital Audio Tape) player. The ISU 12 may also be a solid state device with memory (e.g., RAM (Random Access Memory) or EEPROM (Electrically Erasable Programmable Read Only Memory)), processor and audio synthesizer. Alternatively, the ISU 12 may contain multiple audio playback devices, one for each type of information. For example, one playback device may play only news whereas another one plays only weather information and a third one plays only sports information, etc. The audio recordings may be manually replaced or updated at predetermined intervals during a day or during a week depending on the type of the information and on the desired recency of the information.

Figure 2:
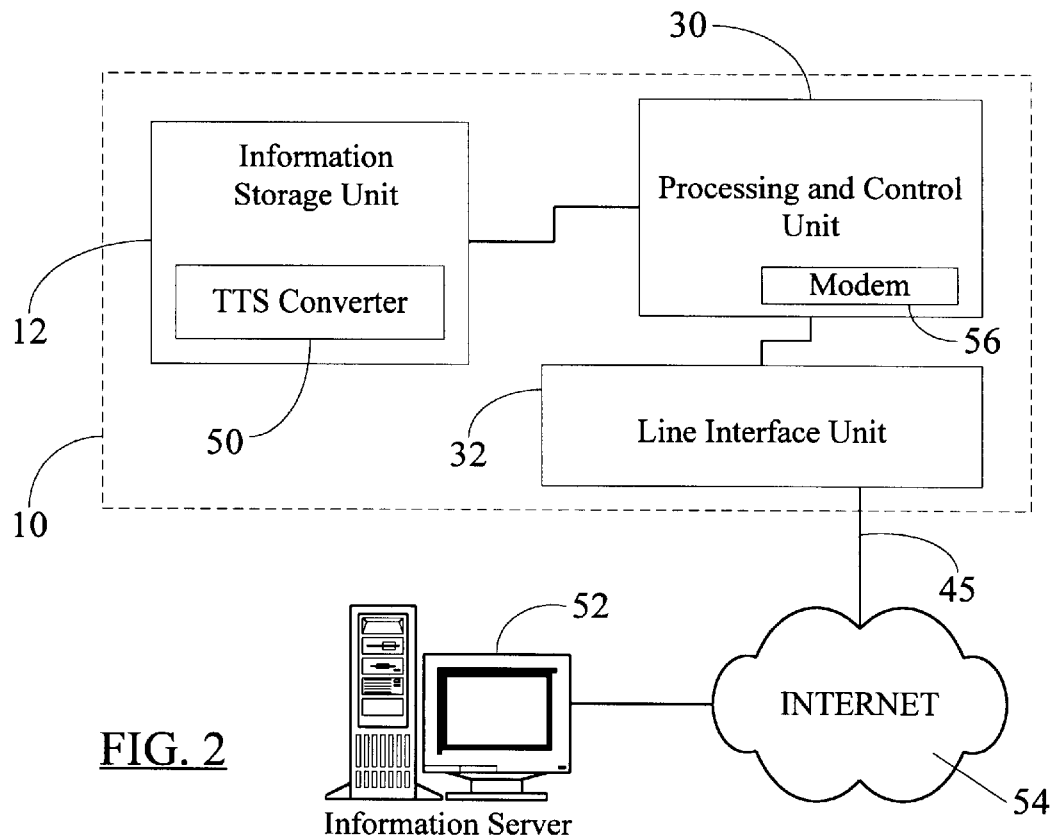
FIG. 2 depicts the information storage unit of the payphone of FIG. 1 with a text-to-speech (TTS) converter as part thereof in a partial view of the payphone.

Referring now to FIG. 2, the information storage unit 12 of the payphone 10 of FIG. 1 is depicted with a text-to-speech (TTS) converter 50 as part thereof in a partial view of the payphone 10. FIG. 2 further illustrates a setup whereby the processing and control unit 30 retrieves data from a remote information server 52 via the Internet 54 and stores the data into the information storage unit 12. The TTS converter 50 may be implemented in software or hardware. The ISU 12 may be a computing device that is capable of converting digital information into analog synthesized speech prior to relaying the speech signals to the audio logic unit 42 (and, hence, to the speaker in the handset 24). The TTS converter 50 converts the information from a digital text format into a digital audio file format for later playback by the audio logic unit 42.

The desired information may be stored in the ISU 12 using one of a number of digital text formats, e.g., HTML (Hyper Text Markup Language) format, ASCII (American Standard Code for Information Interchange) format, XML (Extensible Markup Language) text file format developed by W3C (World Wide Web Consortium), SGML (Standard Generalized Markup Language) format based on ASCII text, etc. Similarly, the digital audio file formats may include file extensions such as, for example, ".WAV"(wave file), ".AIFF"(Audio Interchange File Format), ".AU"(audio file), etc. In one embodiment, the TTS converter 50 implements an SGML-based TTS markup language, such as STML (Spoken Text Markup Language) developed by the Lucent Technologies of Murray Hill, N.J., USA. The TTS converter 50 may convert a text file into an STML file that can be audibly played back later (by the audio logic unit 42) when required.

The conversion of data text files into an audio file format may be performed either during storing of the data into the ISU 12 or dynamically during playback. In other words, information may be stored in either a text file format or an audio file format depending on design and implementation considerations. The audio logic unit 42 (illustrated in FIG. 1) is in communication with the PCU 30 and may include an audio speech processing unit, e.g., a DIALOGIC® speech processing card manufactured by Dialogic Corporation, 1515 Route 10, Parsippany, N.J., USA 07054, to generate human voice announcements upon execution of an audio file. The data may be downloaded as digital text files from the external information server 52 via the Internet 54 as described immediately hereinbelow.

The PCU 30 may include a modem 56 to initiate internet access via the line interface unit 32. The LIU 32 may then place a call over the telephone line 45 (and through the central office or PBX 44) to get connected to the Internet 54. Once the information server 53 is accessed via the Internet 54, the PCU 30 may download requisite data files in appropriate digital text format as discussed hereinbefore. The retrieved data/information files may then be transferred to the ISU 12 to update corresponding categories of information stored therein as well as to add one or more categories of information if desired by the payphone information service provider. The Internet access may be performed during off-peak times or at periodic intervals everyday or at predetermined days of a month. If more than one telephone line is available, the Internet may be accessed simultaneously with the user listening to the information or placing a phone call (on the other telephone line).

Figure 3:
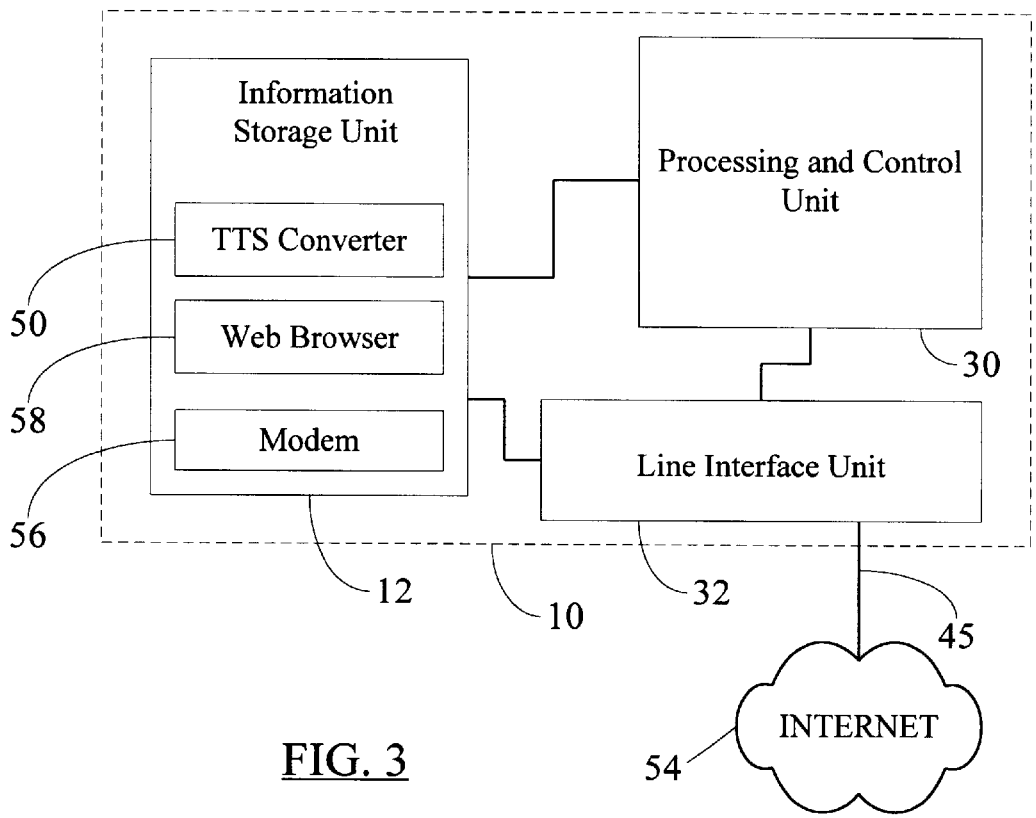
FIG. 3 illustrates a partial view of the payphone of FIG. 1 and an arrangement wherein the information storage unit itself retrieves data from the Internet.

Turning now to FIG. 3, a partial view of the payphone 10 of FIG. 1 is illustrated along with an arrangement wherein the information storage unit 12 retrieves data from the Internet 54. In that embodiment, the ISU 12 includes the modem 56 and a web browser software 58 to access, search and retrieve data from the Internet 54. The PCU 30 may determine or monitor when and for how long the Internet access is to be carried out by the ISU 12. The ISU 12 may be coupled to the LIU 32 to dial into the Internet via the telephone line 45. The web browser software may be a standard HTML browser software (e.g., the Microsoft Internet Explorer® or the Netscape Navigator®. The web browser 58 may be programmed to access a predetermined set of websites for each category of information (e.g., news, weather, sports, tourism, etc.). The data retrieved from the Internet may then be transferred from the LIU 32 to the ISU 12 directly with or without the PCU 30 control.

In one embodiment, the ISU 12 may include a VXML (voice extensible markup language) web browser to facilitate voice-based web access via the payphone handset 24. In other words, after the payphone user has selected the information retrieval option, the payphone user may be prompted by the ISU 12 VXML web browser to speak one or more identifying words (e.g., "news", "weather", "entertainment", etc.) that the VXML browser may accept to retrieve relevant information from the Internet 54 using those words. The retrieved information may then be displayed on the screen 22 in real-time. The VXML browser may also be used to support voice-enabled electronic commerce (e-commerce) applications using the payphone handset 24 as a device to input voice.

Besides providing audible information, the arrangement illustrated in FIG. 3 may also be utilized to provide e-commerce services to the users of the payphone 10. In that event, an option may be displayed on the display screen 22 informing the user about the availability of accessing the Internet 54 via the payphone 10 using, for example, a calling card. The time spent on Internet 54 may then be billed to the user's calling card, the number of which the user may need to enter prior to receiving the Internet information on the display screen 22. Alternatively, the user may simply swipe the calling card as if initiating a telephone call and may then select the Internet access option to continue retrieving information from the Internet at a predetermined call rate. The keypad 18 may be modified to include additional keys to point and select a choice on the screen 22. Audible option selection may also be possible with the VXML browser and the handset 24 as described hereinbefore.

Figure 4:
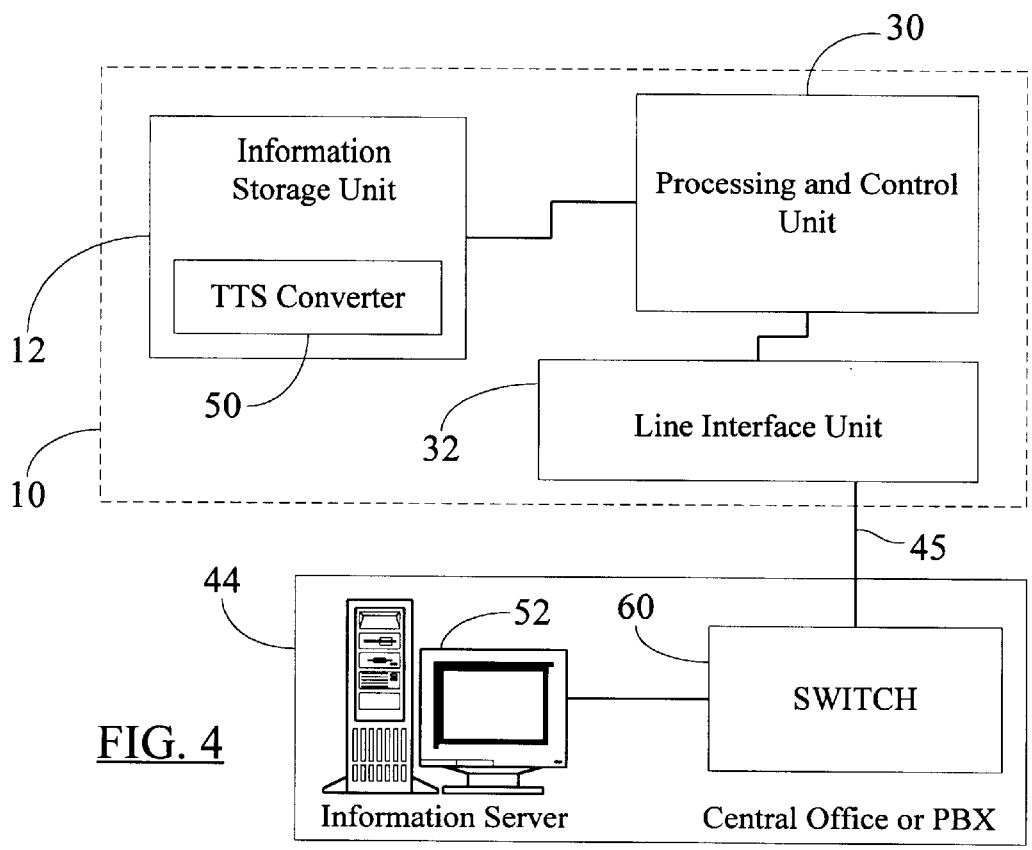
FIG. 4 displays a configuration wherein the information server is located within a telco central office.

Referring now to FIG. 4, a configuration wherein the information server 52 is located within a telco central office 44 is displayed. Here, the processing and control unit 30 retrieves data from the central office information server 52 to be stored in the information storage unit 12 depicted in a partial view of the payphone 10. Thus, the storage and upgrade of information within the ISU 12 is performed "locally", i.e., via the CO or PBX 44, instead of, for example, via the Internet 54 (as explained hereinbefore with reference to FIGS. 2–3). The PCU 30 initiates the data retrieval process by sending a query to the CO 44 through the LIU 32, which is shown connected to a CO (or PBX) switch 60 via the telephone line 45. The switch 60 performs necessary call routing and switching operations as well as call congestion control. The switch 60 may be a fully-programmable digital electronic switch that can perform millions of switching operations per second as part of its call traffic management. The switch 60 may be configured to connect the information server 52 to the telephone line 45 when a query (originated by the PCU 30) is received from the LIU 32 over the telephone line 45. The PCU 30 may then establish communication link with the information server 52 as part of its data retrieval operation. The retrieved data is then stored in the ISU 12. The manner of data storage (in the ISU 12) and the frequency of data retrieval from the information server 52 within the CO or PBX facility 44 may be similar to that earlier discussed with reference to the embodiments illustrated in FIGS. 2–3.

Figure 5:
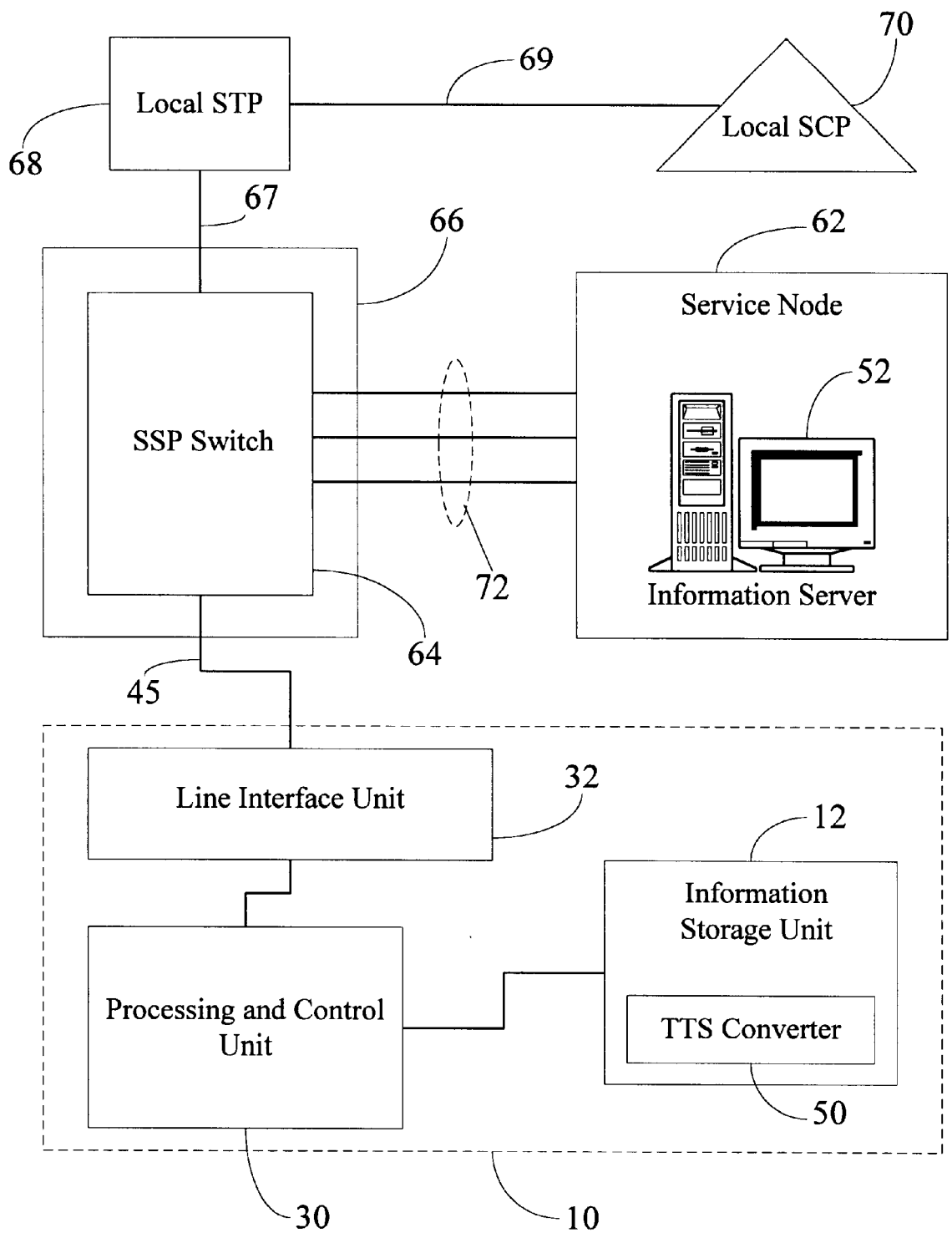
FIG. 5 shows an exemplary configuration wherein the information server is part of a service node in an AIN topology and an SSP switch is configured to facilitate data download from the information server to the information storage unit.

FIG. 5 shows an exemplary configuration wherein the information server 52 is part of a service node 62 in an AIN (Advanced Intelligent Network) topology and an SSP (Service Switching Point) switch 64 is configured to facilitate data download from the information server 52 to the information storage unit 12. The AIN topology is associated with modern digital telephone switching systems. The SSP switch 64 is shown as part of an AIN central office 66. The payphone 10 is shown connected to the SSP switch 64 (and, hence, to the AIN central office 66) via the telephone line 45.

The difference between an SSP central office switch (e.g., the switch 64 in FIG. 5) and a non-SSP central office switch (e.g., the switch 60 in FIG. 4) is that the former includes intelligent network functionality. In other words, an SSP switch, e.g., the switch 64, is equipped with appropriate hardware and software so that when a set of predetermined conditions are detected, the switch will initiate a "trigger" for a predetermined state of a call on a subscriber line (here, the telephone line 45), generate the trigger as an appropriate message to be sent out over the AIN, suspend handling of a call until it receives a reply from the network instructing it to take certain action. In the alternative, the SSP switch 64 will have a default task to execute if a timeout occurs and no response is provided by the network to the query made by the SSP switch 64. The SSP switch 64 is thus fully equipped to take advantage of various AIN features.

A typical AIN architecture includes a local signal transfer point (STP) 68 connected to the SSP switch 64 via a data link 67. The data link 67 may be, for example, a 56 kilobits per second bidirectional data link employing a signaling protocol referred to as the Signaling System 7 (SS7) protocol. The SS7 protocol is a layered protocol wherein each layer provides services for layers above it and relies on the layers below to provide it with the services. The SS7 protocol employs packetized data transfer. All of the SS7 data packets from the SSP switch 64 go to the local STP 68. The STP 68 is typically a multi-port high speed packet switch that is programmed to respond to the routing information in the appropriate layer of the SS7 protocol, and route the packet to its intended destination.

FIG. 5 also illustrates a local SCP (service control point) 70 connected to the STP 68 via an SS7 data link 69. Much of the intelligence, and the basis for many of the new enhanced features of the AIN reside in the local SCP 70. A service control point (e.g., the SCP 70) is a relatively powerful fault-tolerant computer that can execute millions of instructions per second. Among the functions performed by the SCP 70 are maintenance of network data bases used in providing enhanced services. The SCP 70 may include a database that identifies particular service customers. In the AIN, a relatively small set of triggers are defined at the switches for each call. A trigger in the network is an event associated with a particular subscriber line that generates a packet to be sent to a service control point in the network. The trigger causes the SCP (e.g., the SCP 70) to query its database to determine whether some customized calling feature or enhanced service should be implemented for this particular call, or whether conventional plain dial-up telephone service should be provided for the call. The SCP 70 sends the results of the data base inquiry back to the SSP switch 64 via the STP 68.

The PCU 30 may dial a specified telephone number or access code to initiate the data retrieval from the information server 52. The LIU 32 may transfer the dialed digit(s) to the SSP switch 64 via the telephone line 45. A trigger may be provided in the SSP switch 64 to facilitate data retrieval functionality. The trigger may be generated as soon as the SSP switch 64 receives an indication from the PCU 30 (in the form of the specified digits received over the telephone line 45) that the access to the information server 52 is desired. The SSP switch 64 then sends the trigger to the local STP 68 which, in turn, forwards the trigger to the local SCP 70. Upon receipt of the trigger, the SCP 70 will determine whether the trigger is for the access to the information server 52 in the service node 62 or for some other service. The SCP 70 will then inform the SSP switch 64 of its decision. In the event that the SCP 70 notifies the SSP switch 64 that the trigger is for access to the information server 52, the SSP switch 64 will access the information server 52 in the service node 62 for information retrieval. The SSP switch 64 then connects the PCU 30 to the information server 52 via the telephone line 45, allowing the PCU 30 to access the information server 52 and to retrieve the desired data therefrom.

In the embodiment depicted in FIG. 5, the information server 52 is shown constituting part of the AIN service node (SN) 62. It is noted that a typical AIN service node 62 may include many more features and may perform functions in addition to those performed by the information server 52. The service node 62 may be physically implemented with the same type of computer that embodies the service control point 70. In addition to the computing capability and database maintenance features, service node 62 may also include voice and DTMF signal recognition devices and voice synthesis devices. The service node 62 may be connected to a service management system (SMS) (not shown) implemented by a large general purpose computer that downloads information into one or more databases associated with the service node 62. For example, the SMS computer may periodically update the information stored within the information server 52.

The service node (SN) 62 may be used when some enhanced feature or service (e.g., the information supply via the information server 52) is needed that requires transfer of a significant amount of data over a switched connection during a call. The SN 62 is shown connected to the SSP switch 64 via Integrated Services Digital Network (ISDN) links 72. Information stored within the information server 52 may be transferred to the LIU 32 using one of the ISDN links 72 once the SSP switch 64 connects the service node 62 to the telephone line 45. The PCU 30 is thus able to retrieve the requisite information from the information server 52 in the SN 62 and to store the retrieved information in the ISU 12. The manner of data storage (in the ISU 12) and the frequency of data retrieval from the information server 52 may be similar to that earlier discussed with reference to the embodiments illustrated in FIGS. 2–4. In one embodiment, the PCU 30 may allow the payphone user to audibly (or visibly, if applicable) receive the user-selected information dynamically while the same information is being stored in the ISU 12. In another embodiment, the payphone owner may allow a payphone user to access the information server 52 in real-time at an additional charge for that service. The information retrieved from the information server 52 may then be sent to the TTS converter 50 prior to sending the audio information file(s) to the audio logic unit 42.

It is noted that the ISU 12 in FIGS. 4–5 may also include a web browser (not shown) that is similar to the one discussed hereinbefore with reference to FIG. 3. The web browser may be useful in the event that the information server 52 has an IP (Internet Protocol) address assigned to it. In such a configuration, the ISU 12 may itself initiate (with the help of the browser, and through the PCU 30) data retrieval from the information server 52 in a manner similar to that described hereinbefore with reference to the information retrieval by the PCU 30.

Figure 6:
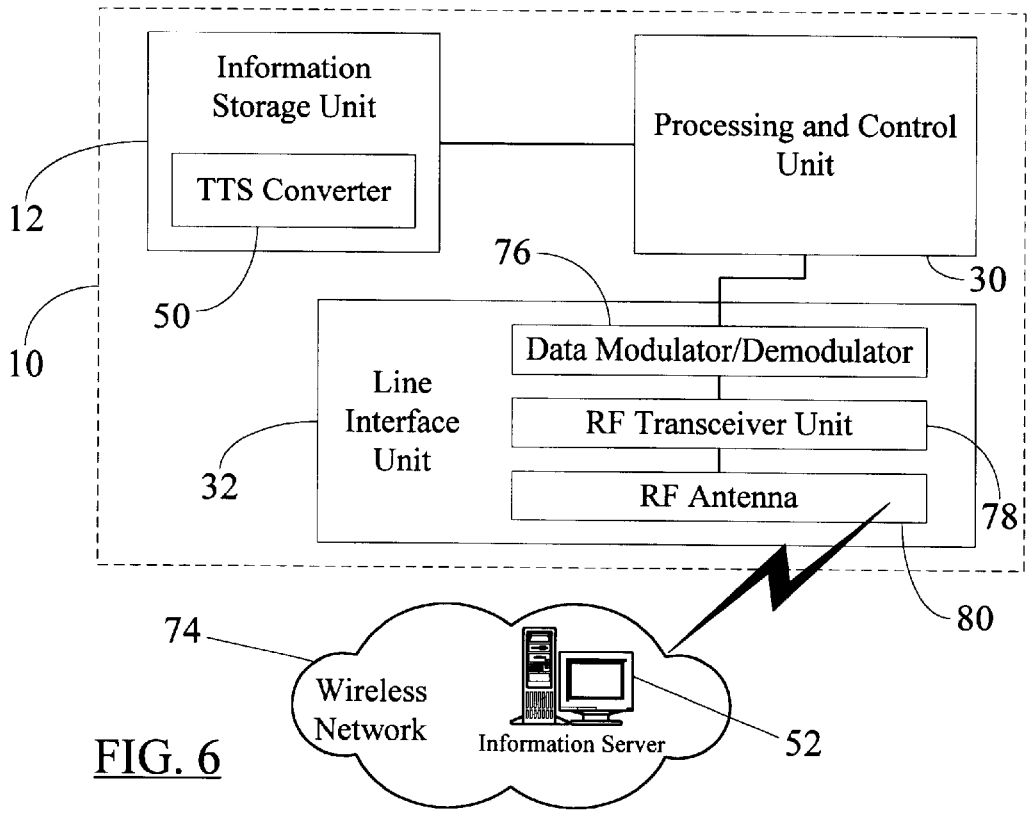
FIG. 6 illustrates the payphone in a configuration used to update the information stored in the information storage unit depicted in a partial view of the payphone via a wireless network.

Turning now to FIG. 6, the payphone 10 in a configuration used to update the information stored in the information storage unit 12 via a wireless network 74 is illustrated. In the embodiment of FIG. 6, a partial view of the payphone 10 is depicted with the LIU 32 comprising a data modulator/demodulator 76, an RF (radio frequency) transceiver unit 78 and an RF antenna 80. The information server 52 may be located within the wireless network 74. For example, the information server 52 may be physically located within an MTSO (mobile telephone switching office) as a database that may be independently accessed by an MSC (mobile switching center), which is an automatic wireless message switching system. In other words, the PCU 30 may address the information server 52 just like another telephone, and the MSC (not shown) may switch to the information server 52 (based on the received request from the PCU 30), thereby connecting the server 52 to the PCU 30. The term "wireless network" as used herein is contemplated to include analog or digital cellular mobile networks irrespective of the underlying digital technology, e.g., CDMA (code division multiple access), TDMA (time division multiple access), etc., and any other radio network that employs intersystem messaging as part of mobile wireless communication.

The request for access originated from the PCU 30 may be first modulated into an appropriate digital format (to accomplish, for example, data compression and/or error correction capability as well as to comply with data transmission protocol for the wireless network 74) by the data modulator/demodulator unit 76. The modulated request is then transmitted using the RF transmitter (in the RF transceiver unit 78) and the RF antenna 80 over a wireless communication channel to the appropriate MSC (not shown) in the wireless network 74. Once the connection to the information server 52 is established, the MSC transfers data from the information server 52 to the RF antenna 80 through the wireless communication channel established earlier and using the same data transmission protocol as that used for the data sent from the payphone 10. The data received by the RF antenna 80 is then sent to the RF receiver (in the RF transceiver unit 78) and then to the demodulator portion of the data modulator/demodulator unit 76. The demodulated digital data is then transferred to the ISU 12 for storage therein.

The ISU 12 may also include a WAP (wireless application protocol) browser (not shown) to allow the ISU 12 to access the Internet 54 using a mobile communication network. The WAP browser may also be useful in the event that the information server 52 has an IP (Internet Protocol) address assigned to it. In such a configuration, the ISU 12 may itself initiate (with the help of the WAP browser, and via the PCU 30 and the LIU 32) data retrieval from the information server 52 in a manner similar to that described hereinbefore with reference to the information retrieval by the PCU 30.

Figure 7:
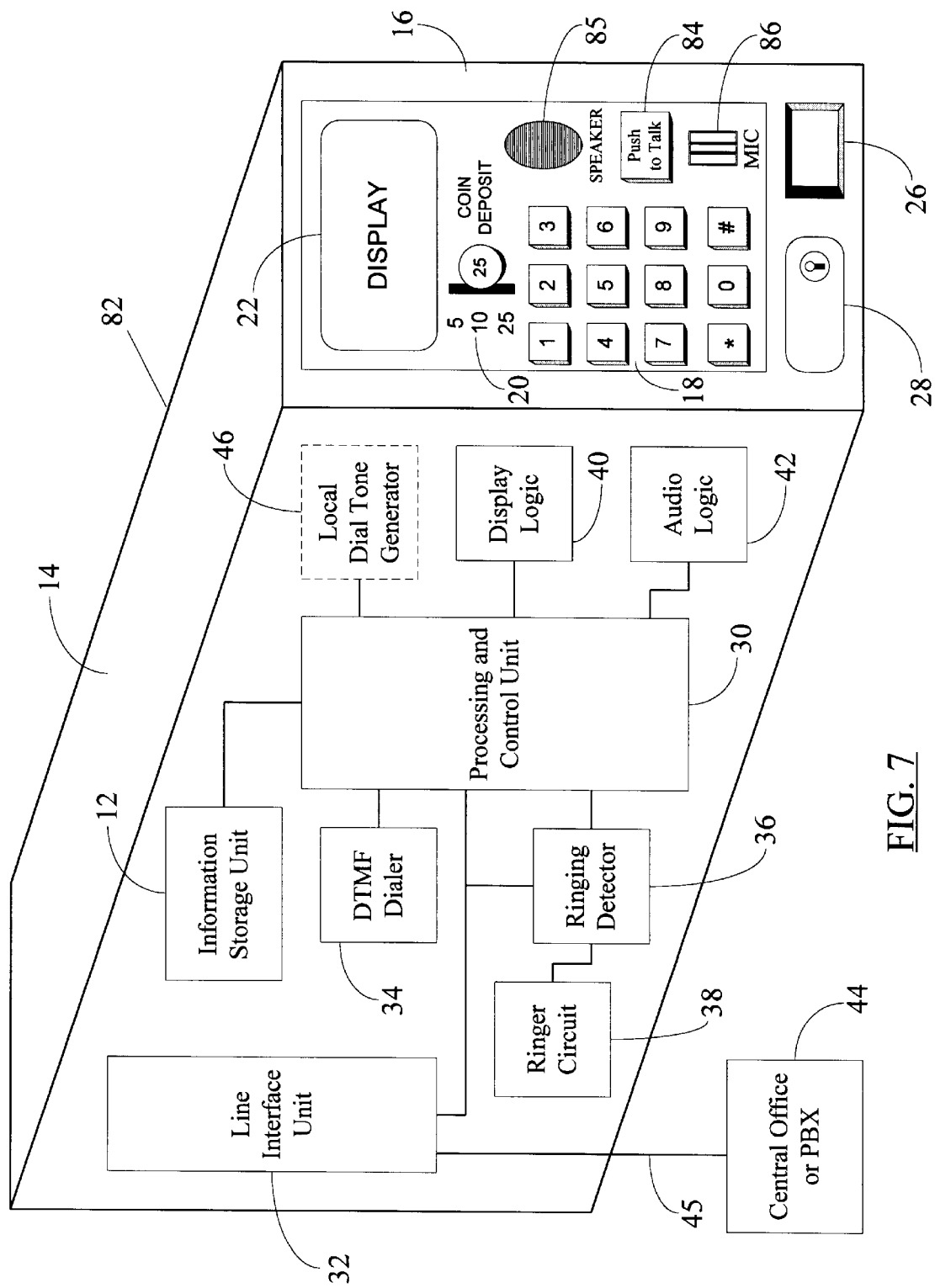
FIG. 7 is an exemplary perspective diagram of a "hands-free" payphone with the information storage unit as part thereof.

FIG. 7 is an exemplary perspective diagram of a "hands-free" payphone 82 with the information storage unit 12 as part thereof. Instead of the handset 24 (FIG. 1) to provide a means to communicate over the payphone 10 in FIG. 1, the payphone 82 in FIG. 7 provides hands-free communication in that the front panel 16 is provided with a push-button 84 that a user can push to initiate a telephone communication. When a user pushes the push-button 84, a sensor (not shown) detects that the payphone is placed "off-hook" and generates an off-hook signals similar to that generated in case of the payphone 10 with handset 24 in FIG. 1. The user may listen to the audio messages over a speaker 85 integrated in the front panel 16 and may speak into a microphone 86, also integrated in the front panel 16, to communicate hands-free.

Except for the handset 24 (FIG. 1), all other components (e.g., the PCU 30, the LIU 32, the housing 14, etc.) in the payphone 82 are the same as those discussed hereinbefore with reference to the payphone 10 in FIG. 1. Therefore, these components in FIG. 7 are illustrated with numerals identical to those depicted in FIG. 1 and a further discussion thereof is not provided herein. It is also noted that the discussion given hereinbefore with reference to FIGS. 2–6 equally applies to the payphone 82 of FIG. 7. In one embodiment, a payphone (not shown) may include both the handset 24 (FIG. 1) and the elements for hands-free option (i.e., the push-button 84, the speaker 85 and the microphone 86) to provide the user with multiple options for telephone talk. The user may switch from the handset 24 and the hands-free option, and vice versa, during a telephone conversation.

The arrangement of components shown in the embodiments of FIGS. 1 and 7 may be varied depending on the desired payphone configuration, technological advances, space availability to mount a payphone, etc. For example, some circuit elements (e.g., the audio logic unit 42, the display logic 40, etc.) currently shown in FIGS. 1 and 7 as disposed within the housing 14 may be easily placed near the back of the front panel 16 depending on the desired geometry and space considerations. In short, the arrangement of components in FIGS. 1 and 7 is for illustration only and does not necessarily limit the flexibility to configure the housing 14 and the front panel 16 as desired.

It is noted that the audio information stored in the ISU 12 may be manually or electronically (e.g., remotely via the telephone line 45) replaced or updated at predetermined intervals during a day or during a week depending on the type of information and on the desired recency of the information. The information update may be automated so that, for example, the PCU 30 or the ISU 12 may initiate the update process without human intervention. In one embodiment, the switch 60 (FIG. 4) or the SSP switch 64 (FIG. 5) may be configured to automatically download updated information from the information server 52 (FIGS. 4 and 5) to the payphone 10. In another embodiment, the owner of the payphone 10 may place a call to the telephone number assigned to the payphone 10 and may remotely instruct the PCU 30 or the ISU 12 to activate the information update function using a predefined access code. Different or alternative schemes to update information content of the ISU 12 may be similarly devised. For example, information update may be coordinated with one or more information providers. Thus, information providers (e.g., CNN, NBC, ABC, NEXIS, etc.) may automatically download the updated information via, for example, the Internet 54 (FIGS. 2,3) as soon as updated information becomes available or at certain predetermined time instances.

The foregoing describes exemplary embodiments of a coin-operated telephone or payphone that audibly provides user-selected information stored in an information storage unit within the payphone. The information stored in the information storage unit may include information on such frequently-requested categories as, for example, news, weather, sports, financial market reports, local travel and tourism information, etc. The localized storage of relevant information facilitates quick retrieval of the information when requested by the user. The user of the payphone may be charged a nominal fee each time the user requests information from the payphone. Various techniques to store and update the information (e.g., manually, via the Internet, via an external information server, etc.) in the information storage unit have also been disclosed hereinabove. The information is thus directly available from the payphone itself. This allows payphone user to obtain a wide range of information from the payphone without resorting to phone calls to multiple sources of information and without incurring substantial, unnecessary expenses related to such phone calls.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A payphone comprising:

a speaker;

an off-hook sensor configured to generate an off-hook signal upon detecting an off-hook condition;

a housing;

an information storage unit located within the housing and having audio information stored therein, wherein the information storage unit is configured to send one or more parts of the audio information to the speaker when connected thereto so as to enable a user of said payphone to listen to said one or more parts of the audio information;

a processing unit in the housing and coupled to the information storage unit and the off-hook sensor, wherein the processing unit is configured to receive the off-hook signal from the off-hook sensor and thereafter connect the information storage unit to the speaker upon occurrence of a predetermined event; and a line interface unit located within the housing and coupled to the processing unit and a communication network, wherein the line interface unit is configured to provide a signaling interface between the processing unit and the communication network, wherein the processing unit is configured to automatically perform the following before said user accesses said payphone:

connect via the line interface unit to an information server coupled to the communication network, and download said one or more parts of the audio information stored in said information server into said information storage unit.

2. The payphone as in claim 1, wherein the information storage unit includes a text-to-speech converter to convert a portion of said one or more parts of the audio information downloaded in a digital text file format from said information server into a digital audio file format so as to allow audible playback of said portion of said one or more parts of the audio information to said user through said speaker.

3. The payphone as in claim 1, wherein the communication network is at least one of a wireline communication network and a wireless communication network.

4. The payphone as in claim 3, wherein the wireline communication network includes the Internet.

5. The payphone as in claim 1, wherein the predetermined event constitutes at least one of the following:

manual entry of an access code by the user of the payphone;

deposit of a predetermined amount of money by the user of the payphone;

the user speaking one or more prescribed words; and the off-hook sensor detecting the off-hook condition.

6. The payphone as in claim 1, wherein the processing unit is configured to calculate the amount of money deposited by said user of the payphone and to accordingly adjust the duration of connection of the information storage unit to the speaker.

7. A payphone comprising:

a speaker;

an off-hook sensor configured to generate an off-hook signal upon detecting an off-hook condition;

a housing;

an information storage unit located within the housing and having audio information stored therein, wherein the information storage unit is configured to send one or more parts of the audio information to the speaker when connected thereto so as to enable a user of said payphone to listen to said one or more parts of the audio information;

a processing unit in the housing and coupled to the information storage unit and the off-hook sensor, wherein the processing unit is configured to receive the off-hook signal from the off-hook sensor and thereafter connect the information storage unit to the speaker upon occurrence of a predetermined event; and a line interface unit located within the housing and coupled to the processing unit and a communication network, wherein the line interface unit is configured to provide a signaling interface between the processing unit and the communication network, wherein the processing unit is configured to automatically perform the following while the user is listening to a first portion of said one or more parts of the audio information through the speaker:

connect via the line interface unit to an information server coupled to the communication network, and download a second portion of said one or more parts of the audio information stored in said information server into said information storage unit.

8. The payphone as in claim 7, wherein the processing unit is further configured to automatically send said second portion of said one or more parts of the audio information downloaded into said information storage unit to said speaker when said user finishes listening to said first portion of said one or more parts of the audio information.

9. The payphone as in claim 7, wherein the information storage unit includes a text-to-speech converter to convert said second portion of said one or more parts of the audio information downloaded in a digital text file format from said information server into a digital audio file format so as to allow audible playback of said second portion of said one or more parts of the audio information to said user through said speaker.

10. The payphone as in claim 7, wherein the predetermined event constitutes at least one of the following:

manual entry of an access code by the user of the payphone;

deposit of a predetermined amount of money by the user of the payphone;

the user speaking one or more prescribed words; and the off-hook sensor detecting the off-hook condition.

11. The payphone as in claim 7, wherein the processing unit is configured to calculate the amount of money deposited by said user of the payphone and to accordingly adjust the duration of connection of the information storage unit to the speaker.

12. An information retrieval system comprising:

a telephone switching mechanism;

an information server coupled to the telephone switching mechanism and having audio information stored therein;

a telephone line connected to the telephone switching mechanism; and a payphone that includes:
- a speaker,
- a housing,
- an information storage unit located within the housing and having one or more parts of said audio information stored therein, wherein the information storage unit is configured to send one or more parts of the audio information to the speaker when connected thereto so as to enable a user of said payphone to listen to said one or more parts of the audio information, and
- a processing unit in the housing and coupled to the information storage unit and to the telephone line,
- wherein the telephone switching mechanism is configured to connect said information server to said telephone line upon receiving an indication therefor from said processing unit, and wherein the processing unit is configured to automatically perform the following before said user accesses said payphone:
  - establish a first connection to said telephone switching mechanism over said telephone line,
  - transmit, over said telephone line, said indication to said telephone switching mechanism for a second connection to said information server, and
  - download, over said telephone line, said one or more parts of the audio information stored in said information server into said information storage unit when said second connection is established.

13. The information retrieval system as in claim 12, wherein the information storage unit in said payphone includes a text-to-speech converter to convert a portion of said one or more parts of the audio information downloaded in a digital text file format from said information server into a digital audio file format so as to allow audible playback of said portion of said one or more parts of the audio information to said user through said speaker.

* * * * *